United States Patent
Burt et al.

[11] Patent Number: 4,460,015
[45] Date of Patent: Jul. 17, 1984

[54] THREE-WAY CONTROL VALVE

[75] Inventors: David L. Burt, Grosse Pointe; Gregory J. Krawczyk, Royal Oak, both of Mich.

[73] Assignee: The Bendix Corporation, Southfield, Mich.

[21] Appl. No.: 364,814

[22] Filed: Apr. 2, 1982

[51] Int. Cl.³ .............................................. F16K 11/04
[52] U.S. Cl. .................................. 137/625.5; 137/870
[58] Field of Search ................. 137/625.5, 625.65, 870; 251/84, 86

[56] References Cited

U.S. PATENT DOCUMENTS

| | | | |
|---|---|---|---|
| 3,016,920 | 1/1962 | Thomsen et al. | 137/625.65 |
| 3,356,083 | 12/1967 | Clark et al. | 137/625.5 X |
| 4,284,039 | 8/1981 | Bellicardi et al. | 251/86 X |

FOREIGN PATENT DOCUMENTS

| | | | |
|---|---|---|---|
| 1020134 | 2/1953 | France. | |
| 1489573 | 7/1967 | France. | |
| 2028756 | 10/1970 | France. | |
| 2383372 | 10/1978 | France | 137/625.5 |

Primary Examiner—Gerald A. Michalsky
Attorney, Agent, or Firm—Markell Seitzman; Russel C. Wells

[57] ABSTRACT

An electrically operating three-way control valve adapted to fit with a bore of a cooperating apparatus. The three-way control valve including a low pressure seat and a high pressure seat. The three-way control valve further including movable valve means having a self aligning closure element for seating upon the high pressure valve seat.

13 Claims, 6 Drawing Figures

THREE-WAY CONTROL VALVE

BACKGROUND AND SUMMARY OF THE INVENTION

The invention relates to electrically operated three-way valves for the distribution of fluid from a supply to a plurality of fuel receiving passages or chambers.

The three-way control valve is capable of controlling the fuel flow for many different types of cooperating apparatuses. However, it has been specifically tailored to be accomodated within the diesel unit injector as described in the commonly assigned U.S. Pat. No. 4,418,867 by Sisson entitled "Electrically Controlled Unit Injector". To control the operation of the above-noted unit injector, the three-way control valve must be capable of fitting into a small envelope and be able to provide an effective seal against extremely high hydraulic pressures that are generated in the injectors timing and metering chambers. A feature of the present invention permits the high pressures adjacent a movable lower valve of the present invention to be used to urge the lower valve onto its seat therein utilizing this high local pressure to effect a minimum leakage seal. Furthermore, to provide for an effective seal in the presence of high local hydraulic pressures, the lower valve of the present invention further includes self-aligning means for permitting closure of a movable valve member upon its cooperating seat.

Accordingly, the present invention comprises an electromagnetic three-way valve responsive to electric command signals. The three-way valve comprises first body means defining an upper annular valve seat that includes a first opening therethrough. The valve further includes second means defining an annular lower valve seat oppositely situated from the upper valve seat, the lower valve seat including a second opening therein; first passage means for establishing a fluid flow path for fuid flow from a supply about the upper valve seat through the first opening and out from the body; the second passage means for communicating fuel from the supply to the second opening of the lower valve seat and out from the body; third means for selectively opening and closing one of the first or second openings and for selectively closing the other of the first or second openings and spring means for closing one of the first or second openings in the absence of electric command signals.

Many other objects and purposes of the invention will be clear from the following detailed description of the drawings.

DETAILED DESCRIPTION OF THE DRAWINGS

Figure 1:
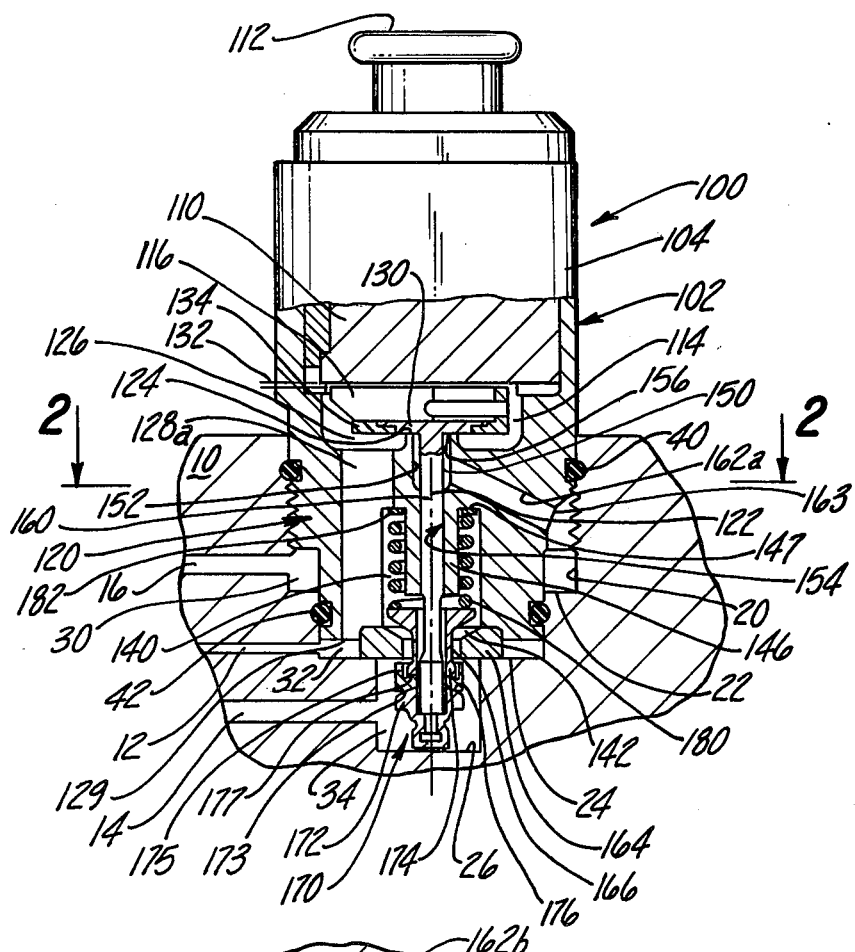
FIG. 1 is a sectional view of one embodiment of the invention.
Figure 2:
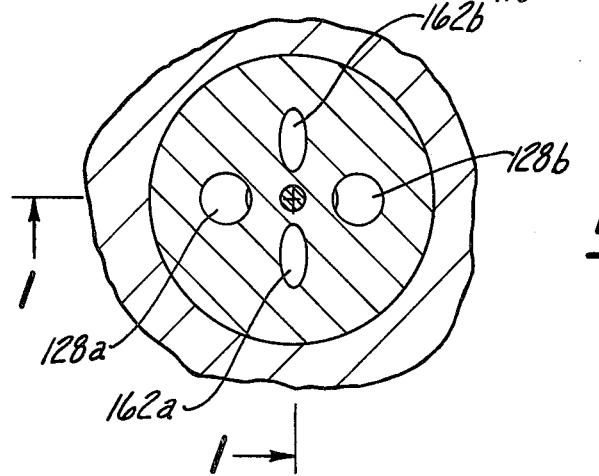
FIG. 2 is a cross-sectional view taken through section 2—2 of FIG. 1.

Reference is now made to FIGS. 1 and 2 which illustrate one embodiment of a three-way valve 100 which functions to selectively distribute fluid received from a supply passage, generally designated as 12 to a first or timing passage generally designated as 14 or to a second or metering passage generally designated as 16. In the ensuing description, the operation and structure of the three-way valve 100 will be described in conjunction with an apparatus 10 having the supply, timing and metering passages (12, 14 and 16) formed therein. The three-way valve 100 includes a housing 102 having an upper portion 104 and a lower portion or lower body member 120. It should be appreciated that the housing can be formed by separate pieces or, as illustrated, in FIG. 1 the upper portion 104 and the lower body member 120 can be formed as an integral unit. The valve 100 is received within a stepped bore 20 of the apparatus 10. The stepped bore includes a first shoulder 22, a second shoulder 24 and bottom portion 26. The lower body member 120 and the stepped bore 20 cooperate to define three annular fluid holding or collecting chambers (32, 34 and 30) which can be viewed as extensions of supply passage 12, timing passage 14 and metering passage 16 respectively. A fluid tight seal is achieved between the apparatus 10 and the three-way valve 100 by utilizing the set of O-rings 40 and 42. In addition a metal-to-metal seal is established at the shoulder 24.

It should be appreciated that the apparatus 10 does not form part of the invention, but illustrates one application of the three-way valve 100. The three-way valve 100 need not be received within the apparatus 10, alternatively communications can be accomplished by modifying the housing 102 to incorporate thereon physical ports (not shown) which could be connected by fluid lines to communicate fluid to the supply, timing and metering passages (12, 14 and 16) of a remotely located apparatus 10.

It is contemplated that the three-way valve will find application in an apparatus such as a single solenoid unit injector similar to that which is disclosed in commonly assigned patent application to Sisson entitled "Electrically Controlled Unit Injector" U.S. Ser. No. 364,813, now U.S. Pat. No. 4,418,867, and which is incorporated herein by reference. As shown therein a unit injector includes a variable volume metering chamber for metering determinable quantities of fuel to a fuel engine and further includes a variable volume timing chamber. Both chambers selectively receive fluid from a supply or source of fuel through the three-way valve 100. In the operation of the unit injector or for that matter any similar apparatus 10 the pressure of fuel contained in the chambers 30, 32 and 34 may undergo dramatic pressure changes. Consequently the three-way valve 100 must operate effectively and properly seal against these pressures. As described below, the present invention is so designed as to maintain a repeatable operation while not requiring excess electromagnetic energy to activate same in the presence of extreme pressure differentials created by the fluid residing in the chambers 30, 32 and 34. In addition the pressure in chamber 34 is used to enhance the sealing function of the three-way valve 100.

Returning again to FIG. 1 the lower body member 120 includes an interior first surface 124 and an annular first recess 126 situated below the first surface 124 wherein the first recess 126 is preferably centrally situated about a central axis 122. The lower body member further includes first passage means for defining a fluid passage within the lower body member 120 and for communicating supply fluid to the first recess 126. More particularly the first passage means comprises at least one axially extending passage 128 extending through the lower body member 120 and terminating at one end at the first recess 126. The other end of passage 128 is adapted to receive fuel from a supply or chamber 32. This other end of passage 128 could also serve to define a first port 129. The embodiment of FIG. 1 utilizes two such passages 128a and b as illustrated in FIG. 2. The upper portion of the housing 104 houses a stator 110 of a known variety for developing a magnetic field and has a connector 112 adapted to receive electrical signals input thereto. The stator 110 is positioned apart from the lower body member 120 defining a volume 114 therebetween. Those skilled in the art will appreciate that the stator further comprises an electromagnetic coil (not shown). An armature means 116 is loosely received within the volume 114 located between the stator and the lower body member 120. The armature means is preferably fabricated of magnetic laminates and is attached to a plunger 160 and is movable in response to the magnetic field generated upon the activation of the stator. The volume 114 which is situated between a first surface 124 of the lower body member and the stator may be viewed as an extension of the recess 126 which forms part of the first passage means. It can be seen from FIG. 1 that fuel is permitted to flow from the supply through the axially extending passages 128a and b into the volume 114 and through the gap 132 above the armature 116. The gap 132 between the armature means 116 and the stator means 110 is set by a spacer 134 interposed therebetween.

An upper valve means 130 which may comprise a portion of the plunger 160 or armature means 116 is situated below, and is movable with, the armature means 116. The upper valve means 130 selectively seats and seals upon a low pressure or upper valve seat 156 which as hereinafter described is formed by the area between the first recess 126 and the passage or bore 152.

As defined below the lower body member 120 further includes means for supporting the plunger 160 and means for supporting a spring 180. The lower body member further includes an axially located annular second recess 140 partially extending through the lower body member 120 and having an opening 142 situated opposite the first surface 124 through which the spring 180 is received. The second recess 140 contains a bottom or seat 147 situated opposite from the opening 142. The second recess 140 forms in cooperation with the elements of the lower body member 120 a cylindrical axially located upraised boss 146 that serves to support the plunger 160. The spring 180 is seated upon a spacer 182 that is fitted about the boss 146. The second recess 140 is sized to intersect the passages 128 to provide fluid communication therebetween. The lower body member 120 further has fabricated within the upper extreme of the boss 146 a central stepped bore (150, 152) having an upper enlarged upper bore 152 terminating at the first surface and a narrow lower bore 154 extending through the boss 146 through which the plunger 160 is received. The surface area of the first surface 124 located between the first recess 126 and the central stepped bore (150, 152) defines the upper valve seat 156. The lower body member 120 further includes second passage means including at least one skew passage 162 isolated from the passage 128 and connected to the enlarged bore 152 for transporting fuel therefrom. FIG. 2 illustrates the relationship of the two skew passages 162a and b used herein. In the embodiment of the invention as illustrated in FIG. 1, the second passage means including passage 162 terminates at the annular fluid collecting chamber 30. This end of the passage 162 defines a second port 163. Equivalently, as previously mentioned the second passage means 160 could terminate at a fuel port (not shown) fabricated within the housing 102. A high pressure or lower valve seat 164 is centrally located about the central axis 122 and is situated on the lower body member 120 opposite from the first surface. The lower valve seat 164 includes a central opening 166 extending therethrough in fluid communication with the second recess 140.

Figure 3:
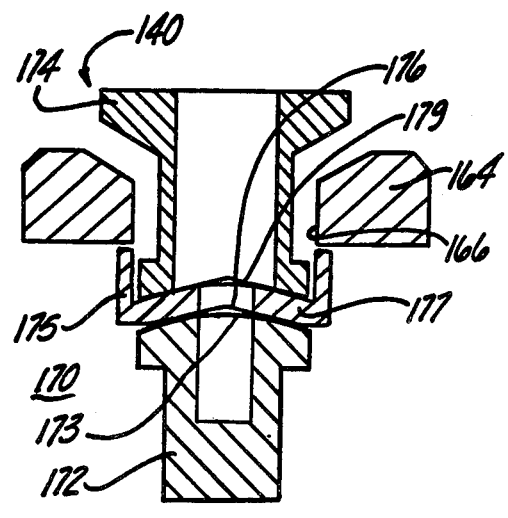
FIG. 3 illustrates a movable valve member used in FIG. 1.

The three-way valve 100 further includes lower valve means (170, 172, 174, 175) attached to the lower end of the plunger 160 and movable therewith for seating upon the lower valve seat 164 and for selectively opening and sealing the central opening 166. The lower valve means is more clearly illustrated in FIG. 3. The lower valve means includes a preload spacer 174 movably situated about the plunger 160 (not shown) extending through the central opening 166 at one end and extending into the annular recess 140 at its other end. The spring 180 as shown in FIG. 1 is maintained in contacting engagement with a preload spacer 174 for biasing the lower valve means (170, 172, 174, 175) apart from the lower body member 120 and to maintain the opening 166 in an open condition. To accomodate for the situation wherein the axis of the plunger 160 and the sealing surface of the lower valve seat 164 are not perpendicular, the lower valve means further includes self-aligning means for permitting the lower valve means to effectively seal upon the lower valve seat 164. In the preferred embodiment of the invention, the self aligning means includes a nut 172 attached to the lower end of the plunger 160. The nut includes an upper spherical surface 173. The self aligning means further includes a hollow cup-shaped valve 175 that is rotatably and slidably situated between the pre-load spacer 174 and the nut 172. The cup-shaped valve 175 includes a lower conically shaped surface 176 which provides a line contact with the spherical surface 173 of the nut 172. The cup-shaped valve 175 further includes an upper surface 177 having a spherical contour. In the preferred embodiment the center of the spherical surface 173 and the center of the upper surface 177 are the same. Finally, the lower surface 179 of the pre-load spacer 174 engaging the upper surface 177 is fabricated to have a conical shape therein providing a line contact therebetween.

As illustrated in FIG. 1 the three-way valve is shown in its unactivated state wherein the spring 180 biases the lower valve means 170 in an open position. During this time pressurized fuel is communicated from the supply 12 to the first passage 128. This pressurized fuel fills the volume 114 and surrounds the armature 116. The fluid is similarly communicated to the recess 140 and flows through the central opening 166 and out through the open area between the lower valve seat 164 and the lower valve means. Upon receipt of electrical command signals, a magnetic field is generated which lifts the armature 116, upper valve means 130 and plunger 160 into the housing 102 therein causing the lower valve means 170 to seal upon the lower valve seat 164. The upper valve means 130 is moved away from its corresponding upper seat 156 therein establishing fluid communication between the first recess 126 and the bore 152. The upward movement of the armature means 116 is aided by the pressure force created by the fuel adjacent the lower valve means 170. In addition, this pressure force further urges the lower valve means 170 onto its seat 164. This upward motion permits fuel to flow from the supply through the passage 162 and port 163 and out from the three-way valve 180 through passage 16 of the apparatus.

It is desirable to provide a three-way valve 100 which has repeatable performance especially upon activation and which does not require excessive electromagnetic forces to be activated. This is accomplished by pressure compensating the low pressure or upper valve seat 156 and the high pressure or lower valve seat 164 such that the electromagnetic force required to activate the control valve 100 is relatively independent of flow rate.

As an example, in conjunction with the Sisson unit injector it is desirable to activate the control valve 100 to initiate the release of fuel from the injector. Just prior to the injection of fuel, fuel flow is from the timing chamber passage 14 through the open lower valve means 170, into annulus or chamber 32 and out through the supply passage 12. The restriction provided by passage 12 elevates the fluid pressure in annulus 32, recess 140, volume 114 and passages 128 as a known function of flow rate thus causing its pressure $P'_s$ to raise above supply pressure $P_s$. During this time the pressure of the fluid in chamber 34 is essentially the same as the pressure in the injector timing chamber $P_t$; the pressure in passage 12 is approximately the supply pressure $P_s$ and the pressure $P_m$ in the metering passage 16 and bore 150 is also approximately at supply pressure.

The elevated pressure $P'_s$ in the volume 114 being greater than $P_m$ creates a first pressure force to urge the upper valve means 130 downwardly, further onto its seat 156 therein enhancing the seal thereacross. This pressure sealing has an additional advantage which is, that a smaller spring 180 is required to maintain the upper seal. However, when the valve 100 is opened the electromagnetic forces developed must act against this flow dependent first pressure force which may effect the repeatability of its operation. The flow across the open area of the valve means 170 creates a pressure differential or second pressure force, proportional, inter alia, to flow rate and spacing, tending to urge the cup-shaped valve 175 upward, onto its seat. These opposing pressure forces across the valve seats 156 and 164 can be pressure compensated if the annular area $A_1$, of the upper valve seat 156 and the total sealing area $A_2$ of the end of the wall of the valve 175 are determined to satisfy the following relationship $(P'_s - P_m)A_1 = (P_t - P'_s)A_2$. By compensating or balancing these pressure forces the electromagnetic forces needed to activate the control valve 100 as well as its response time are made to be relatively independent of fuel flow rate.

Figure 4:
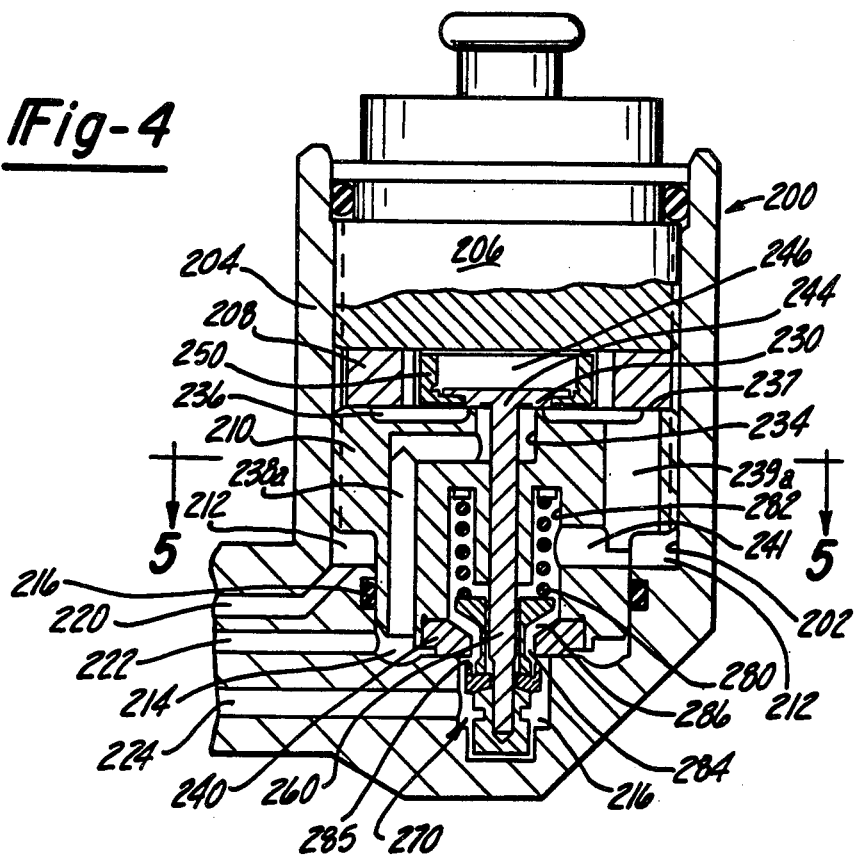
FIG. 4 is an alternate embodiment of the invention.
Figure 5:
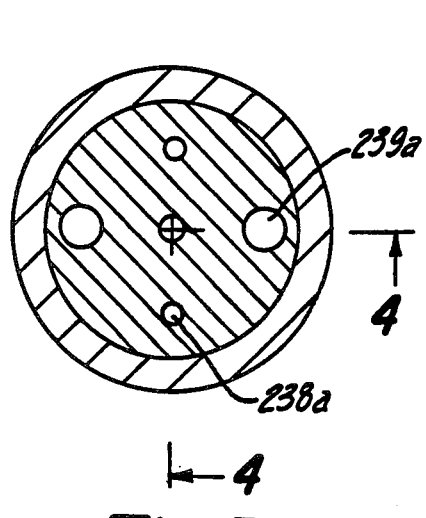
FIG. 5 is a cross-sectional view taken through section 5—5 of FIG. 4.

Reference is now made to FIGS. 4 and 5 which illustrate cross-sectional views of alternate embodiment of the present invention. More particularly there is illustrated a three-way valve 200 that is received within a stepped bore 202 of a coacting apparatus 204. The operation of the three-way valve 200 is virtually identical with that of the three-way valve 100 previously described, however, it should be appreciated that the three-way valve 200 does not utilize a separate housing such as housing 102. More particularly the three-way valve 200 includes an upper member or stator 206, a spacer 208 and a lower body member 210. The three-way valve (200, 206, 208, 210) is received within the stepped bore 202 to define in cooperation with the stepped bore a plurality of fluid connecting chambers 212 and 214. An O-ring 216 serves to isolate and seal the chambers 212 and 214. The three-way valve 200 and stepped bore 202 further form another fluid connecting chamber 216. The apparatus 204 further includes a plurality of fuel passages 220, 222 and 224 for establishing communication with the fluid collecting chambers 212, 214 and 216.

The lower body member 210 further includes a low pressure or upper seat 230 formed between a stepped bore 234 and a centrally located annular recess 236 which is located on a first surface 237 of the lower body member 210. The upper portion of the stepped bore 234 is connected to the fluid connecting passage 214 via a passage 238a. Fluid is communicated from the collecting chamber 212 to the annular recess 234 via the longitudinal passages 239a and b. The relationship between the passages 239a and b and 238a and b are more clearly illustrated in FIG. 5. It should be appreciated that while the present embodiment of the invention illustrates two such passages, 238 and 239, this is not a requirement of the present invention. An upper valve 244 is provided to selectively seal with the upper valve seat 230. The upper valve 244 is connected and moved with an armature 246 in response to the magnetic field generated upon the activation of the stator 206. The armature 246 is provided with a cup-shaped holder 250 which maintains the structural integrity of the magnetic laminates of the armature 246. The three-way valve 200 further includes a high pressure or lower valve seat 240. A plunger 260 is connected at one end to the upper valve 244 and at its other end to a lower valve 270. The valve 270 is identical with the previously described valve 170 and will not be described further. A spring 280 is fitted within a recess 282 of the lower body member 210 to exert a bias force upon the lower valve 270. The recess 282 is communicated to the passages 239 through passage 241. Fuel is communicated from the passage 224 to an opening 284 in the valve seat through a passage 286.

In operation pressurized fuel from a supply is communicated through passage 220. With the three-way valve 200 in its unactivated position fluid is permitted to flow through supply passage 220, chamber 212, recess 282 to the openings 284, 285 and into passage 224. In the activated position the armature draws the plunger 260 toward the stator therein causing the lower valve 270 to close the opening 285 and also to permit fuel to flow from passage 240 into the annular recess 236 and out of the three-way valve 200 via passage 222.

Figure 6:
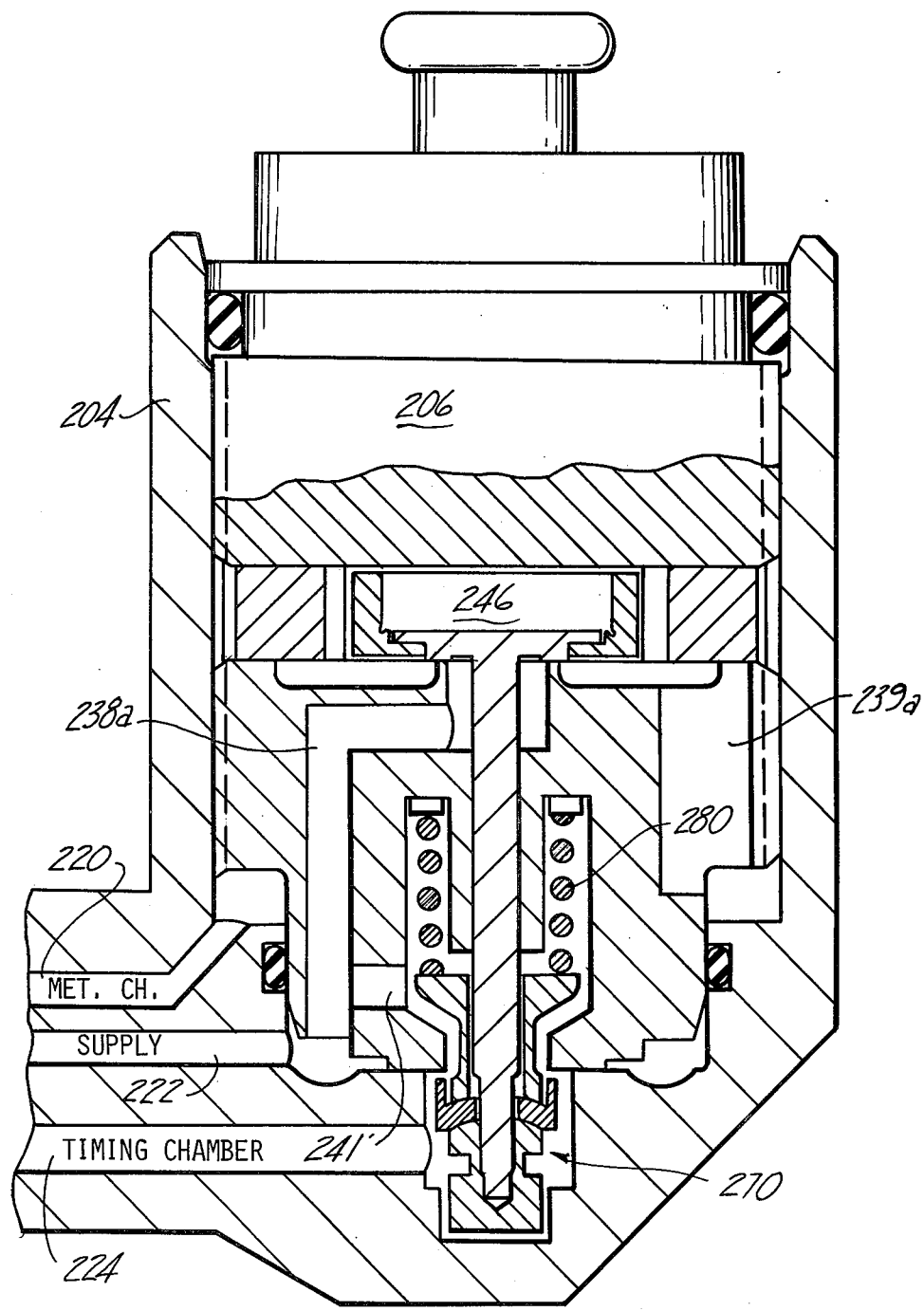
FIG. 6 illustrates another embodiment of the invention.

Reference is briefly made to FIG. 6 which illustrates a further embodiment of the invention. The valve shown therein is virtually identical to the valve shown in FIG. 4 with the exception that fuel passage 222 is adapted to receive fuel from a supply and passage 220 represents an outflow passage that could be adapted to communicate to a metering chamber of a fuel injector. A further modification of above noted valve requires that passage 238 communicates with the recess 282 and the passage 241'.

In addition by interchanging the supply and metering connections at passages 200 and 222 the pressure forces created across the upper valve seat 156 and across the lower valve seat 164 tend to move the armature upward. These forces in cooperation with the electromagnetic force upon activation tend to further increase the upward or closure speed of the valve means 270 upon its seat 240.

Many changes and modifications in the above-described embodiment of the invention can of course be carried out without departing from the scope thereof. Accordingly, that scope is intended to be limited only by the scope of the appended claims.

Having thus described the invention, what is claimed is:

1. A three-way valve comprising:
   a lower body member including a central axis, a first end, an annular first recess situated on said first end;
   first passage means for communicating fluid to said first recess;
   an axially located annular second recess partially extending through said lower body member, having an opening situated opposite to said first end and having a bottom seat situated opposite said opening, said second recess forming in cooperation with other elements of said lower body member a cylindrical axially located upraised boss, said second recess intersecting said first passage means, to provide fluid communication therebetween;
   a central stepped bore having an enlarged bore terminating a said first end, and a narrow bore extending through said boss;
   second passage means isolated from said first passage means and connected to said enlarged bore for transporting fluid from said enlarged bore out of said lower body member and wherein;
   the surface area of first end between said first recess and said central stepped bore defines an upper valve seat;
   a lower valve seat centrally located about said central axis and situated on the lower body member opposite from said first end; including a central opening therethrough;
   a plunger having one end slidably and fluid tightly engaging the walls of said narrow bore, and having another end extending beyond said lower valve seat;
   lower valve means attached to said another end of said plunger and movable therewith for seating upon said lower valve seat and for selectively opening and sealing said central opening; including a pre-load spacer situated about said plunger and extending through said central seat opening into said annular recess;
   spring means adapted to fit about said boss for biasing said lower valve means apart from said lower body member;
   upper valve means, situated above and movable with said plunger for selectively sealing upon said upper valve seat.

2. The three-way valve as defined in claim 1 further including:
   electromagnetic means, responsive to control signals for moving said plunger;
   stator means having a connector adapted to receive electric signals input thereto and for developing a magnetic field, said stator means positioned apart from said lower body member substantially opposite from said first end; and
   armature means loosely situated within the volume between said stator means and said lower body member, and attached to said plunger for moving in response to the magnetic field, and wherein said volume comprises part of said first passage means.

3. The three-way valve as defined in claim 1 further including a spacer interposing said armature means and said lower body member for controlling the gap between said armature means and said stator means.

4. The three-way valve as defined in claim 3 wherein said lower valve seat includes a washer-like member lodged within said lower body member.

5. The three-way valve as defined in claim 4 wherein said central axis and the axis of said plunger are skewed relative to one another and wherein said lower valve means includes self-aligning means for permitting sealing upon said lower valve seat.

6. The three-way valve as defined in claims 4 or 5 wherein said lower valve means further includes:
   a nut attached to said another end of said plunger including an upper spherical surface;
   a cup-shaped valve rotatably and slidably situated between said pre-load spacer and said nut, said cup-shaped valve having a lower conical surface to provide a line contact with said upper spherical surface, and an upper surface having a spherical contour wherein the center of said upper spherical surface and said upper surface are the same and wherein;
   said pre-load spacer includes a conically shaped engagement surface for engaging said upper surface.

7. A three-way valve as defined in claim 6 further including third passage means in communication with said lower valve means for permitting fluid flow therethrough.

8. A three-way valve comprising:
   a lower body member including a central axis, a first end, an annular first recess situated on said first end;
   an axially located annular second recess partially extending through said lower body member, having an opening situated opposite to said first end and having a bottom seat situated opposite said opening, said second recess forming in cooperation with other elements of said lower body member a cylindrical axially located upraised boss;
   a centrally stepped bore having an enlarged bore terminating at said first end, and a narrow bore extending through said boss;
   first passage means for communicating fluid to said enlarged bore;
   second passage means remote from said first passage means and connected to said first recess for transporting fluid from said first recess out of said lower body member and wherein;
   the surface area of the first end between said first recess and said central stepped bore defines an upper valve seat;
   a lower valve seat centrally located about said central axis and situated on the lower body member opposite from said first end; including a central opening therethrough;
   a plunger having one end slidably and fluid tightly engaging the walls of said narrow bore, and having another end extending beyond said lower valve seat;
   lower valve means attached to said another end of said plunger and movable therewith for seating upon said lower valve seat and for selectively opening and sealing said central opening; including a pre-load spacer situated about said plunger and extending through said central seat opening into said annular recess;

spring means adapted to fit about said boss for biasing said lower valve means apart from said lower body member; and upper valve means, situated above and movable with said plunger for selectively sealing upon said upper valve seat.

9. The three-way valve as defined in claim 8 further including:

electromagnetic means, responsive to control signals for moving said plunger;

stator means having a connector adapted to receive electric signals input thereto and for developing a magnetic field, said stator means positioned apart from said lower body member substantially opposite from said first end; and armature means loosely situated within the volume between said stator means and said lower body member, and attached to said plunger for moving in response to the magnetic field, and wherein said volume comprises part of said first passage means.

10. The three-way valve as defined in claim 9 further including a spacer interposing said armature means and said lower body member for controlling the gap between said armature means and said stator means.

11. The three-way valve as defined in claim 10 wherein said lower valve seat includes a washer-like member lodged within said lower body member.

12. The three-way valve as defined in claim 11 wherein said central axis and the axis of said plunger are skewed relative to one another and wherein said lower valve means includes self-aligning means for permitting sealing upon said lower valve seat.

13. The three-way valve as defined in claim 12 wherein said lower valve means further includes:

a nut attached to said another end of said plunger including an upper spherical surface;

a cup-shaped valve rotatably and slidably situated between said pre-load spacer and said nut, said cup-shaped valve having a lower conical surface to provide a line contact with said upper spherical surface, and an upper surface having a spherical contour wherein the center of said upper spherical surface and said upper surface are the same and wherein;

said pre-load spacer includes a conically shaped engagement surface for engaging said upper surface.

* * * * *